No. 856,868. PATENTED JUNE 11, 1907.
L. HEFFNER.
RATCHET BOLT.
APPLICATION FILED SEPT. 25, 1905.

WITNESSES.

INVENTOR
LOUIS HEFFNER.
BY
HIS ATTORNEYS.

UNITED STATES PATENT OFFICE.

LOUIS HEFFNER, OF MINNEAPOLIS, MINNESOTA.

RATCHET-BOLT.

No. 856,868.        Specification of Letters Patent.        Patented June 11, 1907.

Application filed September 25, 1905. Serial No. 279,930.

*To all whom it may concern:*

Be it known that I, LOUIS HEFFNER, of Minneapolis, Hennepin county, Minnesota, have invented certain new and useful Improvements in Ratchet-Bolts, of which the following is a specification.

The object of my invention is to provide a bolt having means for permanently locking the nut thereon to prevent it from accidentally working loose and becoming separated from the bolt. The bolt is adapted for use wherever it is desired to form a rigid permanent connection, and is designed particularly for use in railroad work, where the jar of passing trains has a tendency to loosen the nuts on the bolts which secure the rails together at the joints.

My invention consists generally in a bolt having a shank provided with a spirally arranged groove having a series of ratchet teeth on one edge, and a nut having an interiorly arranged projection provided with teeth to engage the teeth on said shank.

Figure 1:
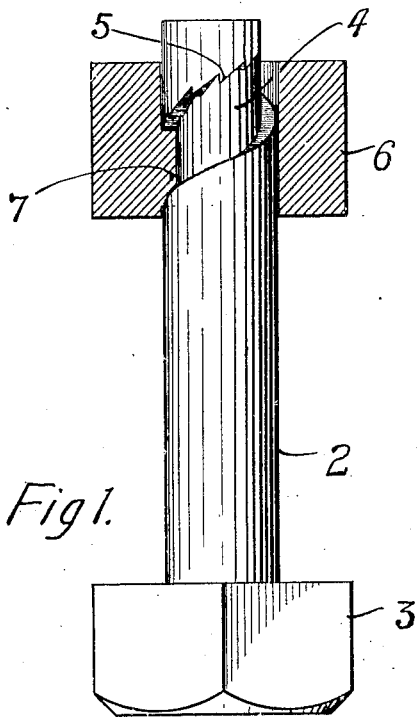
Figure 3:
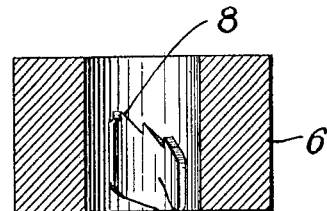
Figure 2:
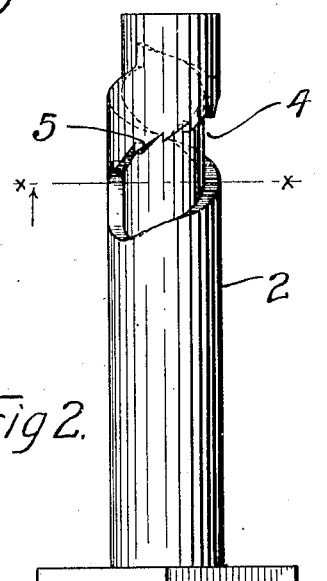
Figure 4:
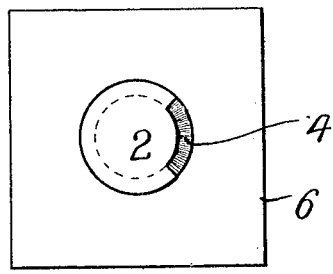
Figure 5:
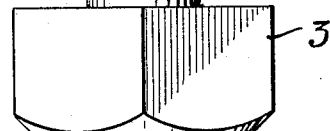
Figure 6:
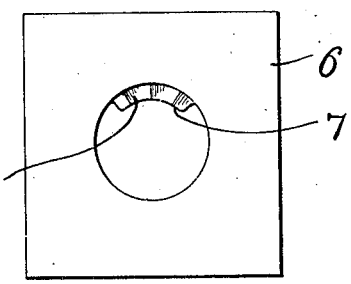

In the accompanying drawings forming part of this specification, Figure 1 is a view partially in section of a bolt embodying my invention. Fig. 2 is a similar view with the bolt removed. Fig. 3 is a sectional view of the nut. Fig. 4 is an end view. Fig. 5 is a sectional view on the line $x$—$x$ of Fig. 2, and Fig. 6 is a view of the nut detached from the bolt.

In the drawing, 2 represents the bolt shank having a head 3 and provided in place of the usual threads at the end opposite from the head with a spiral groove 4 extending inwardly from the end of the bolt on the periphery of its shank and having on its outer edge a series of shallow ratchet teeth 5.

6 is a nut of the ordinary type having a projection 7 therein provided on one edge with teeth 8 corresponding to those on the bolt shank and adapted to engage the same and lock the nut on the bolt. The projection 7 is of suitable width to fit the groove 4 and slide therein as the nut is turned and act as a guide for the nut on the shank and prevent the teeth 8 from becoming disengaged from the teeth 5.

In operation: The bolt having been placed in position the nut is turned thereon and the teeth on the projection 7 sliding over those on the shank will allow the nut to be tightened, and when so tightened the nut will be locked and backward movement of it on the shank will be impossible. Whenever the bolt head or nut become worn and the bolt rendered loose in its socket, the nut can be easily turned to a new position and the bolt tightened.

I claim as my invention:

1. A bolt having a head at one end and a spirally arranged peripheral groove in its other end, a series of ratchet teeth provided in one edge of said groove, and a nut having a projection to fit into said groove and be guided thereby, and teeth to engage the teeth of said groove, substantially as described.

2. A ratchet bolt comprising a shank having a head at one end and a spirally arranged peripheral groove in its other end provided with a series of ratchet teeth on one edge, a nut having a socket to receive the end of said bolt, and a projection adapted to fit into said groove and slide therein and serve as a guide for said nut, and said projection having a series of ratchet teeth on one edge to engage the teeth in said groove and lock said nut on said shank, substantially as described.

In witness whereof, I have hereunto set my hand this 19th day of September 1905.

LOUIS HEFFNER.

Witnesses:
    RICHARD PAUL,
    C. MACNAMARA.